(12) United States Patent
Lallemant

(10) Patent No.: US 9,422,870 B2
(45) Date of Patent: Aug. 23, 2016

(54) THROTTLE HAVING TWO CHANNELS WITH CONTROL VIA EACH CHANNEL

(71) Applicant: Valeo Systemes de Controle Moteur, Cergy Saint Christophe (FR)

(72) Inventor: Mathieu Lallemant, Maisons-Laffitte (FR)

(73) Assignee: Valeo Systems de Controle Moteur, Cergy Saint Christophe (FR)

( * ) Notice: Subject to any disclaimer, the term of this patent is extended or adjusted under 35 U.S.C. 154(b) by 5 days.

(21) Appl. No.: 14/366,776

(22) PCT Filed: Dec. 10, 2012

(86) PCT No.: PCT/FR2012/052861
§ 371 (c)(1),
(2) Date: Jun. 19, 2014

(87) PCT Pub. No.: WO2013/093286
PCT Pub. Date: Jun. 27, 2013

(65) Prior Publication Data
US 2014/0360462 A1   Dec. 11, 2014

(30) Foreign Application Priority Data

Dec. 21, 2011 (FR) .................................. 11 62179
May 15, 2012 (FR) .................................. 12 54432

(51) Int. Cl.
*F02D 9/02* (2006.01)
*F02B 29/04* (2006.01)

(52) U.S. Cl.
CPC .............. *F02D 9/02* (2013.01); *F02B 29/0418* (2013.01); *F02D 2009/0225* (2013.01);
(Continued)

(58) Field of Classification Search
CPC .................... F02B 29/0418; F02M 35/10163; F02M 25/0786; F02M 25/0796; F02M 25/0793; F02D 9/1065; F02D 41/0002; F02D 13/023; F02D 2009/0279; F02D 2009/0281; F02D 2200/0404; F02D 13/0223; F02D 2009/0235; F02D 2009/0269; F02D 2009/0271; Y10T 137/87812; Y10T 137/8782; Y10T 137/87829; Y10T 137/86847; Y10T 137/87837; Y10T 137/86863; Y10T 137/87909; Y10T 137/87804; Y10T 137/86493; Y10T 137/87861; Y10T 137/87523
USPC ......... 123/336, 41.07, 328, 339.22, 367, 376, 123/398, 399, 403, 406.52, 683, 462; 137/637, 637.1, 873–878, 601.11, 137/630.19, 625.44; 251/250.5, 313
See application file for complete search history.

(56) References Cited

U.S. PATENT DOCUMENTS 3,168,082 A * 2/1965 De Villiers .............. F02B 57/08
                                                             123/44 D
4,257,371 A * 3/1981 Ishida .................. F02M 13/023
                                                             123/198 F
(Continued)

FOREIGN PATENT DOCUMENTS

EP   1 512 853 A2   3/2005
FR   2 900 455 A1   11/2007
(Continued)

OTHER PUBLICATIONS

Machine Translation of FR2900455A1, see "FR2900455_MAchineTranslation.pdf", published Nov. 2, 2007.*
(Continued)

*Primary Examiner* — Lindsay Low
*Assistant Examiner* — Long T Tran
(74) *Attorney, Agent, or Firm* — Osha Liang LLP

(57) ABSTRACT

The invention relates to a double distributor for distributing the intake fluid of an engine, comprising a body in which first and second flow channels are arranged, first and second movable shutters being positioned in said flow channels, said distributor also including an actuator motor and kinematics for simultaneously actuating the first and second shutter, characterized in that the kinematics are arranged so as to distribute the flow passing through the first output channel by rotating the first shutter, provide proportional distribution via the two output channels by simultaneously rotating the two shutters, and distribute the flow passing through the second output channel by rotating the second shutter.

14 Claims, 9 Drawing Sheets

Figure 1:
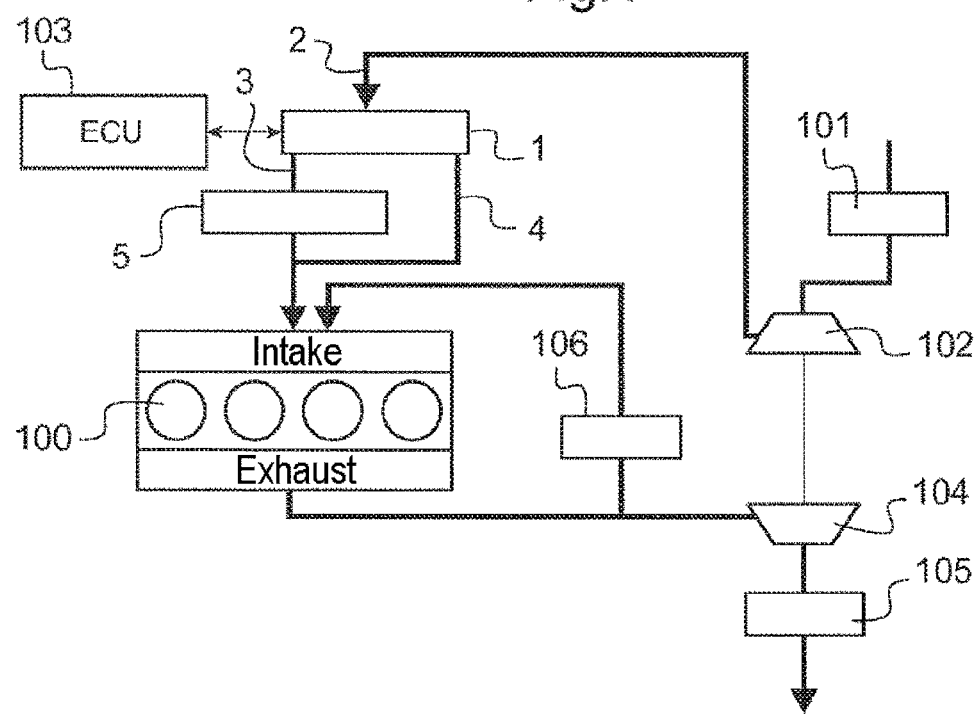

(52) U.S. Cl.
CPC ............... *F02D 2009/0235* (2013.01); *F02D 2009/0254* (2013.01); *F02D 2009/0264* (2013.01); *F02D 2009/0277* (2013.01); *F02D 2009/0279* (2013.01); *Y02T 10/121* (2013.01); *Y02T 10/146* (2013.01)

(56) References Cited

U.S. PATENT DOCUMENTS

| | | | | |
|---|---|---|---|---|
| 4,749,004 | A * | 6/1988 | Peash | B64D 13/00 137/865 |
| 6,039,027 | A * | 3/2000 | Sato | F02D 9/1065 123/399 |
| 6,286,481 | B1 * | 9/2001 | Bos | F02D 9/1065 123/396 |
| 7,156,074 | B2 * | 1/2007 | Hanasato | F02D 9/02 123/337 |
| 7,334,565 | B2 * | 2/2008 | Hanasato | F02D 9/1095 123/336 |
| 7,992,589 | B2 * | 8/2011 | Albert | F02B 29/0418 137/637.1 |
| 8,561,645 | B2 * | 10/2013 | Leroux | 123/568.24 |
| 8,887,761 | B2 * | 11/2014 | Yokoyama | F02M 25/0729 137/601.11 |
| 2009/0293973 | A1 * | 12/2009 | Albert | F02B 29/0418 137/625.44 |

FOREIGN PATENT DOCUMENTS

| | | |
|---|---|---|
| FR | 2 947 319 A1 | 12/2010 |
| WO | 2007/125205 A1 | 11/2007 |

OTHER PUBLICATIONS

International Search Report for corresponding International Application No. PCT/FR2012/052861, mailed Feb. 26, 2013 (2 pages).

* cited by examiner

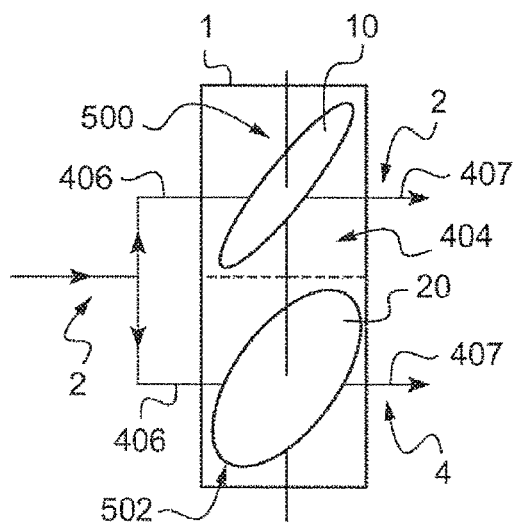
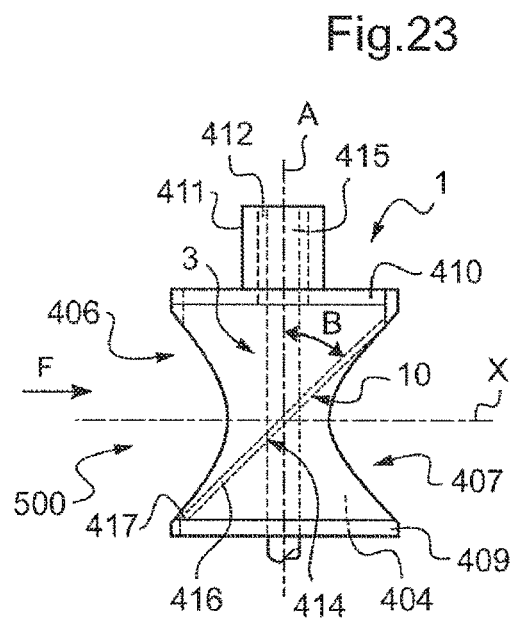
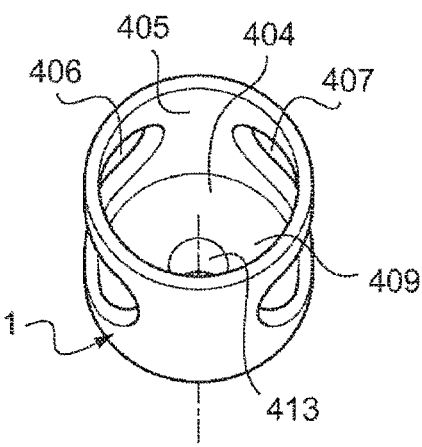
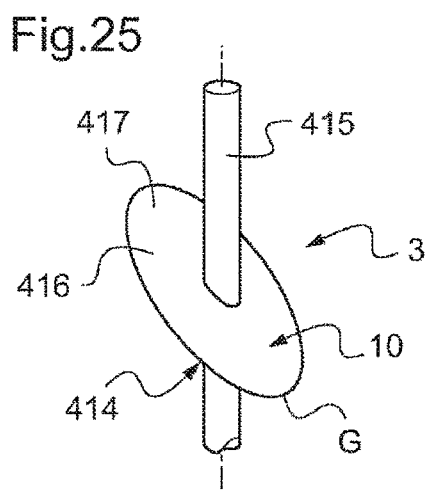
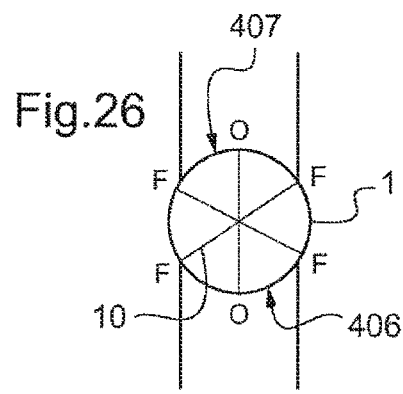

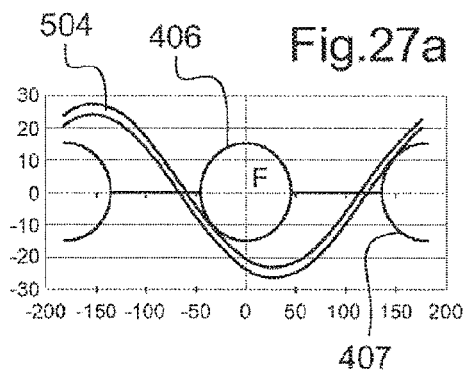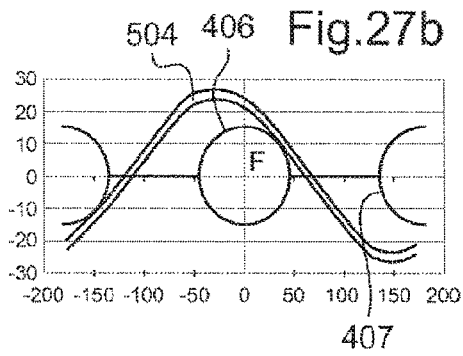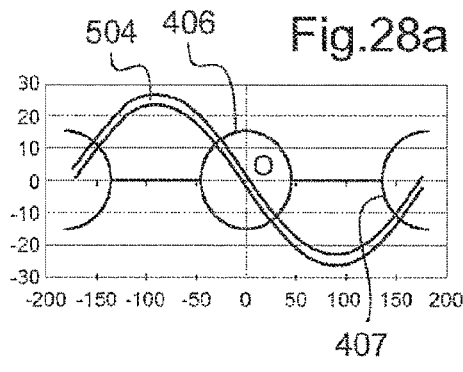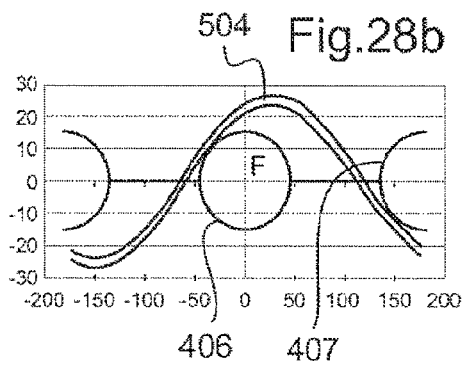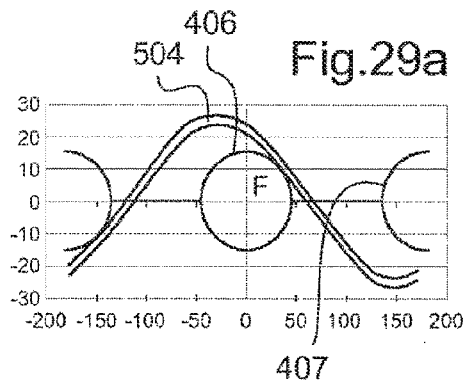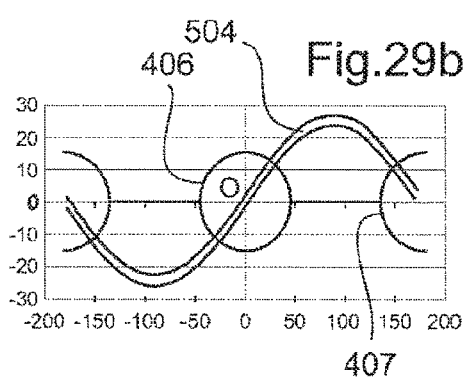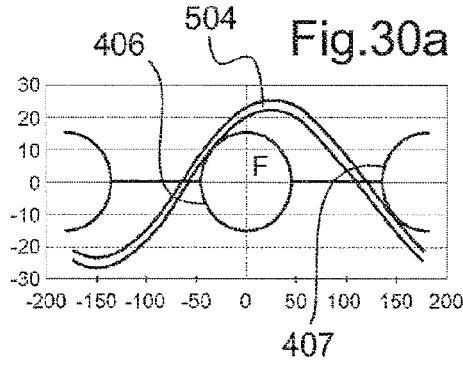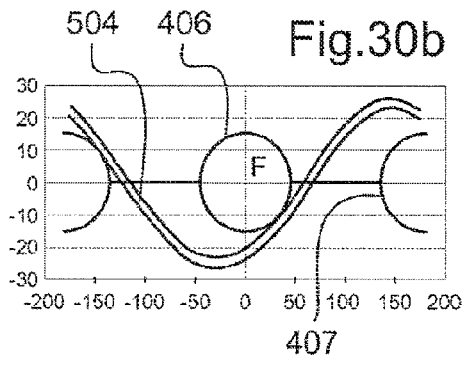

THROTTLE HAVING TWO CHANNELS WITH CONTROL VIA EACH CHANNEL

The field of the present invention is that of automotive vehicles and more particularly that of equipment for supplying the engine.

A heat engine of an automotive vehicle comprises a combustion chamber, generally formed from a plurality of cylinders, in which a mixture of fuel and air is combusted to generate the work of the engine.

Structures are known in which the flow of intake fluid comprising the air required for the operation of the engine is divided between two channels. One of the channels carries a device for cooling said fluid whilst the other channel does not comprise such a device. Said two channels are then combined at the inlet of the engine. A throttle device is thus able to vary the temperature of the intake fluid before the introduction thereof into the cylinders, whether more fluid is conveyed via the channel which passes through the cooler, known as the cooled channel, or via the channel which bypasses the cooler, known as the bypass channel or non-cooled channel. In this manner, the throttle device enables both the quantity of fluid admitted into the cylinders and the temperature thereof to be controlled.

In the prior art, this throttle device was initially produced in the form of two single throttle which receive instructions from the engine control unit and which open their shutters to a greater or lesser extent using an actuator automatically controlled into position. Said throttle also have the function of ensuring, upon a specific command, the stoppage of the engine by positioning their shutters in the fully closed position which shuts down the engine. In their resting position, i.e. that adopted by the shutters in the case of breakdown of the servo-system or when no instructions are received, said shutters are automatically placed in the open position under the action of a restoring spring. These devices have the drawback of using two components and requiring two servo-systems with the associated electrical connections which substantially increases their cost and makes the throttle control system more complex to ensure the simultaneous operation of the two throttle.

A first improvement has been made with the creation of double throttle which combine in a single component the two shutters and the control of their position. Such a device is disclosed, for example, in the patent application WO 2007125205 or FR 2 900 455 of the applicant which discloses a double throttle, the mechanism thereof being actuated by a common motor. In this application, during normal operation, one of the shutters valve intake fluid, the second shutter remaining closed; in a second embodiment, the first shutter is closed whilst the second shutter remains fully open.

The different options offered by these devices for controlling air and/or for adjusting its temperature are, however, limited since there is no possibility of carrying out a control using the second shutter nor is there the possibility of carrying out a control via the two channels.

The application EP 1 512 853 also discloses a double throttle using two shutters, each shutter permitting the control from one channel and the two shutters are actuated permanently such that the control from a single channel is not possible.

The application FR 2 947 319 also discloses a double throttle making it possible either to control only via one or other of the channels or to control via the two channels at the same time.

The object of the present invention is to remedy the drawbacks of the devices already known by proposing a double throttle having a greater flexibility in its possibilities for adjustment.

To this end, the subject of the invention is a double throttle for control the intake fluid of an internal combustion engine and adjusting the temperature thereof, comprising a body in which a first flow channel and a second flow channel for said intake fluid are arranged, and first and second mobile sealing shutters are positioned in said channels to control the flow passing through said channels, said throttle further comprising an actuating motor for said shutters and a kinematic system capable of actuating the first shutter and/or the second shutter in response to a rotation of said motor. The invention is characterized in that the kinematic system is designed to ensure:

the control of the flow passing through the first outlet channel or flow channel by actuating the first shutter, a proportional control via the two outlet channels or flow channels by simultaneous actuation of the two shutters, an increase in the flow via one of the outlet channels or flow channels being associated with a reduction in the flow via the other channel, and the control of the flow passing through the second outlet channel or flow channel by actuating the second shutter.

The double throttle may be characterized in that the kinematic system is designed to ensure selectively:

the control of the flow passing through the first flow channel by actuating the first shutter, a proportional control via the two flow channels by simultaneous actuation of the two shutters, an increase in the flow via one of the flow channels being associated with a reduction in the flow via the other channel, and the control of the flow passing through the second flow channel by actuation of the second shutter.

Such a throttle provides a high degree of flexibility to control the flow and temperature of the intake fluid, making it possible in the first instance to control either cooled fluid or non-cooled fluid and in the second instance to adjust the temperature of this fluid at a constant flow.

The kinematic system is provided to be capable of simultaneously actuating said shutters. Said shutters are mobile and actuated, in particular, in rotation.

Advantageously, a continuous rotation of the actuating motor successively results in said control via the first channel, said proportional control via the two channels and said control via the second channel. Obtaining the desired control or temperature is achieved by a greater or lesser rotation of an actuating motor which has the advantage of being unidirectional.

Preferably, the kinematic system is designed to ensure a full constant flow during said proportional control.

Thus there is a biunique relationship on this operating branch of the throttle between the position of the motor and the temperature of the intake fluid, without altering the controlled flow. The control of the intake fluid is facilitated.

The kinematic system is configured, for example, so that:

the flow in the second channel remains unchanged, in particular at zero, during said control of the flow passing through the first outlet channel, and/or the flow in the first channel remains unchanged, in particular at zero, during said control of the flow passing through the second outlet channel.

According to a first feature of the invention, the kinematic system is configured to ensure:
- said control of the flow passing through the first outlet channel, the position of the second shutter being fixed, in particular closed and/or
- said control of the flow passing through the second outlet channel, the position of the first shutter being fixed, in particular closed.

In other words, the kinematic system is configured to permit a disengagement of the first shutter during the control of the flow passing through the second channel and/or the second shutter during the control of the flow passing through the first channel. The first shutter may be disengaged for certain rotational values of the actuating motor whilst the second shutter may be disengaged for other rotational values of the actuating motor. According to an embodiment the kinematic system comprises:
- a first drive member driving the first shutter, said first drive member being mobile in rotation between two extreme positions located on either side of a resting position corresponding to an absence of entrainment by the actuating motor,
- a second drive member driving the second shutter,
- an intermediate mobile member, in particular mobile in rotation about a drive shaft of the first shutter, common with a rotational axis of said first drive member,
- a spring positioned between the first drive member and the intermediate mobile member, and
- an actuating means capable of displacing the first drive member from the resting position to a first of its extreme positions, counter to the compression of said spring against said intermediate mobile member or an extension of said spring relative to said intermediate mobile member.

In a first embodiment, said intermediate mobile member bears against an abutment connected to the body of the double throttle during said compression.

Preferably, said actuating means is a finger carried by a toothed wheel driven in rotation about the common shaft by said actuating motor, the first drive member being a first plate rigidly connected to the common shaft and comprising at least one extension extending radially to form an abutment for said drive finger and the intermediate mobile member being a second plate which is mobile in rotation about the common shaft, the ends of said spring each being fixed to one of the two plates.

In a second embodiment, said intermediate mobile member is displaced during the displacement of said first drive member, said compression being carried out by a displacement of said first drive member which is slower than that of said intermediate mobile member.

Advantageously, said intermediate mobile member is a ring of an epicyclic gear train, the first drive member being attached to its planet wheel carrier.

More preferably, the second drive member is attached to the planet wheel of said epicyclic gear train.

In a particular embodiment, the rotation of the components of said epicyclic gear train is provided by an element actuated by the actuating motor, said element acting counter to a single restoring spring of said double throttle.

In a preferred embodiment of said double throttle, said fixed positions of the shutters of the first or second channels are the closed position during control of the flow from the other channel.

Preferably, the kinematic system is designed so as to bring each of the shutters into the closed position according to two positions, one corresponding to a return of said shutter relative to the other.

Advantageously, the kinematic system positions the shutters counter to the action of said spring, possibly complemented by the action of a second spring of said throttle, exerting a restoring force toward the resting position of the shutters.

Said resting position given to the shutters of the two channels, in the absence of actuation by the motor, could correspond to the open position for one and the closed position for the other.

In the first embodiment, the actuating motor could drive, via a drive pinion, two toothed wheels meshing with one another, the drive pinion of the actuating motor meshing with one wheel thereof.

One of the ends of the second restoring spring is fixed to a plate connected rigidly to the shaft of the second shutter and comprising at least one abutment against which the corresponding drive finger bears, the other end of said spring being held in rotation by an abutment carried by the body of said double throttle.

According to a further feature of the invention, the double throttle operates without using a disengagement kinematic system.

The body of the throttle thus comprises, for example, a cylindrical internal housing of circular cross section, separated into a first stage for the first flow channel, comprising said first shutter, and a second stage for said second flow channel, comprising said second shutter, said first and second shutters comprising at least one sealing portion arranged in a plane which is inclined relative to said cylindrical housing and cooperating with the lateral wall of said housing by a peripheral generatrix so as to ensure sealed contact between said shutters and the body in at least one angular position. Said throttle further comprises a control rod, driven by said kinematic system and connected to the first and second shutters, said first and second shutters being offset at an angle to one another relative to said control rod and/or said flow channels being offset at an angle to one another relative to said control rod.

The flow channels are, for example, oriented in the same direction and the first and second shutters are offset by 60°.

Said control rod is, for example, continuous and passes through said housing.

According to different embodiments of this further feature of the invention which could be considered together or separately:
- said inclined part of the shutters is designed as a rotating disk, the peripheral edge thereof constituting the contact generatrix with the lateral wall of the cylindrical housing, so as to ensure contact between one cylinder and another,
- the inclined part forms an angle of substantially 45° with the axis of the cylindrical housing of the body,
- the control rod is arranged in the axis of said cylindrical housing and passes through the center of said inclined part of the shutters,
- on one or each of the axial ends of the housing, the rod is mounted in guide bearings fixed to the body of the throttle, in particular to a cover closing said housing,
- said rod and said shutters could be made in a single piece,
- the throttle further comprises a partition separating said first and second stages,
- on each stage, at least one inlet and one outlet for the fluid are formed in said body, said inlet and outlet discharge relative to said internal cylindrical housing, the shutters separating the inlet and outlet in at least one angular position thereof, the inlet and outlet of the same stage are coaxial and perpendicular to the axis of said internal cylindrical housing, in other words, the intake fluid, in particular air, circulates radially and not axially in this stage of the housing, the inlets and outlets are circular and the diameters thereof are smaller than a small axis of the disk forming each shutter.

The invention also relates to an air intake module for an internal combustion engine comprising a double throttle as described above.

The first channel of the throttle is, for example, connected to a cooler of the intake module whilst the second channel short-circuits said cooler, in particular in order to join the intake pipes directly. In the resting position of the throttle, i.e. in the case of absence or loss of entrainment by the drive motor, the first shutter may be open, i.e. permit the flow of the intake fluid toward the cooler whilst the second shutter may be closed, preventing the short-circuiting by the intake fluid from the cooler.

Figure 2:
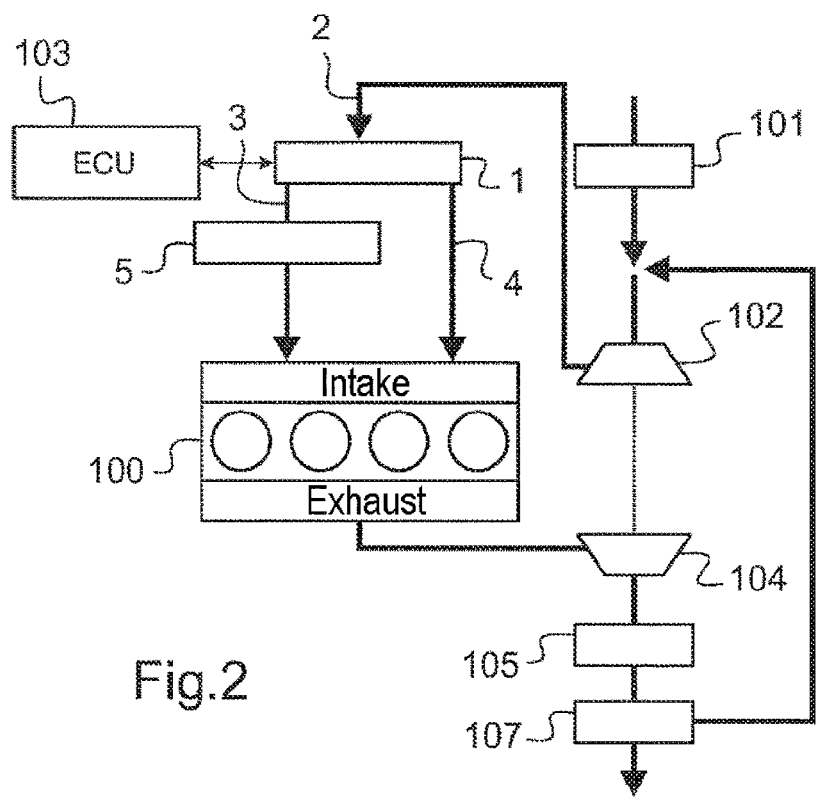
Figure 3:
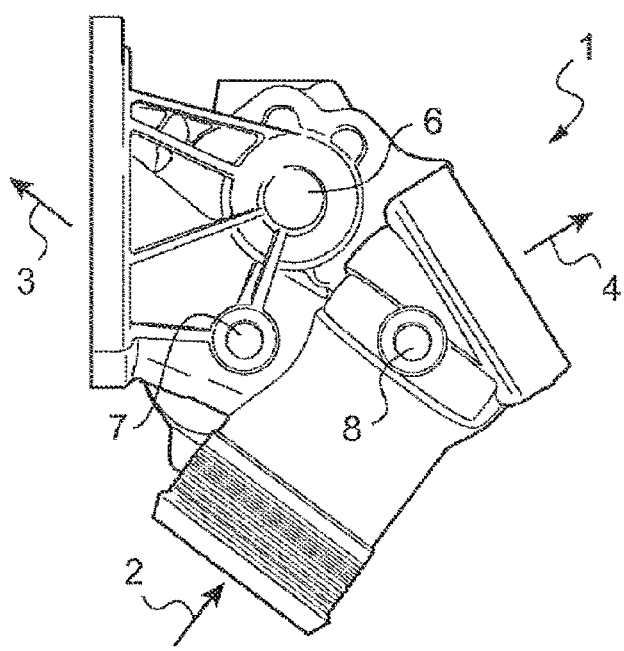
Figure 4:
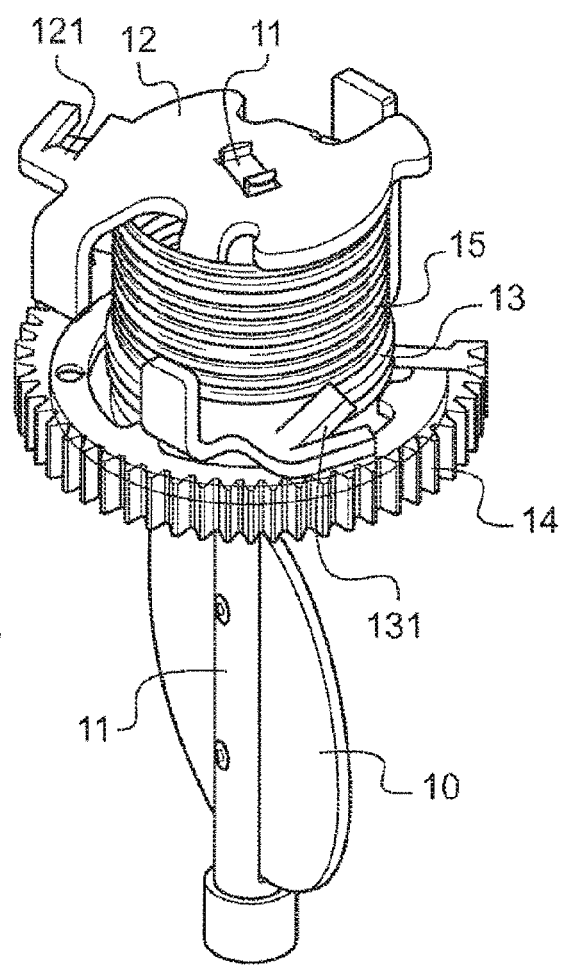
Figure 5:
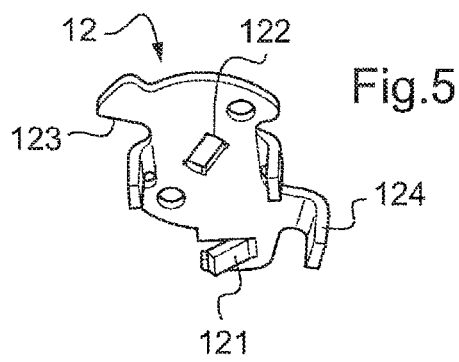
Figure 6:
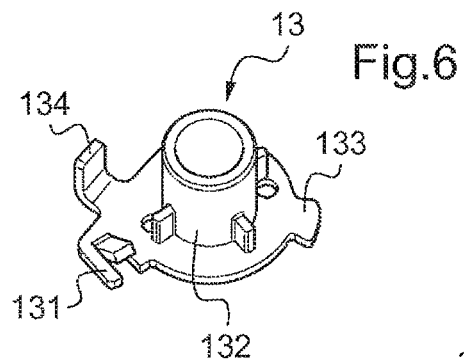
Figure 7:
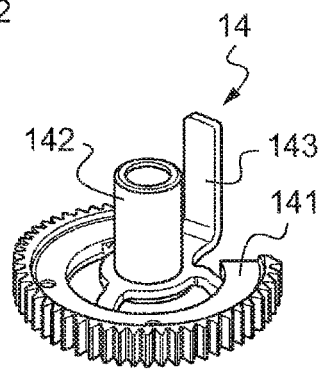
Figure 8:
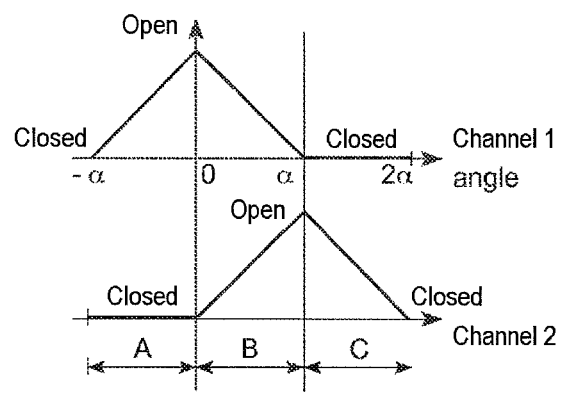
Figure 9:
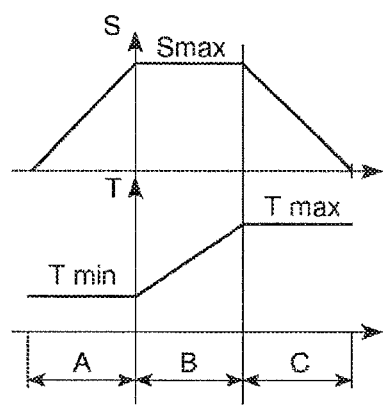
Figure 12:
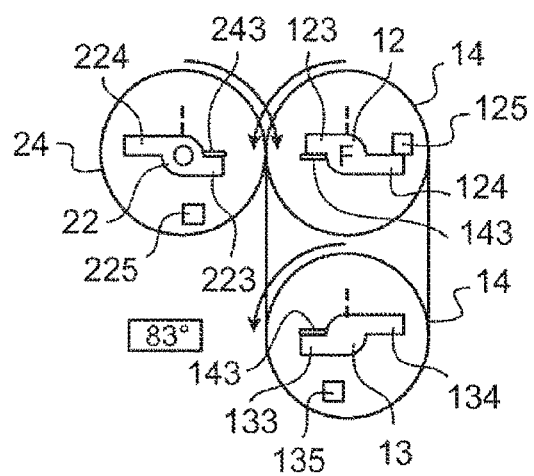
Figure 13:
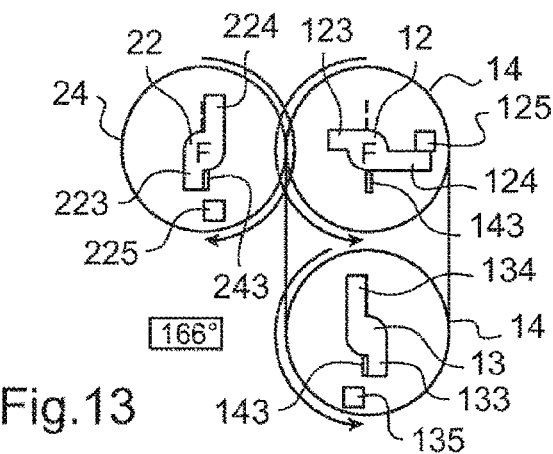
Figure 14:
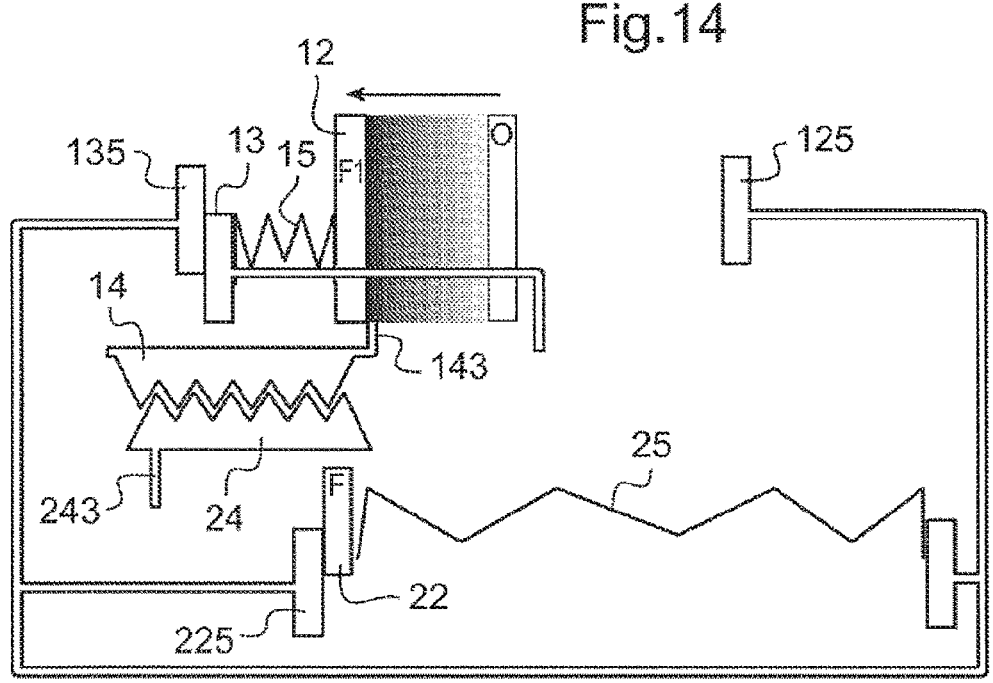
Figure 15:
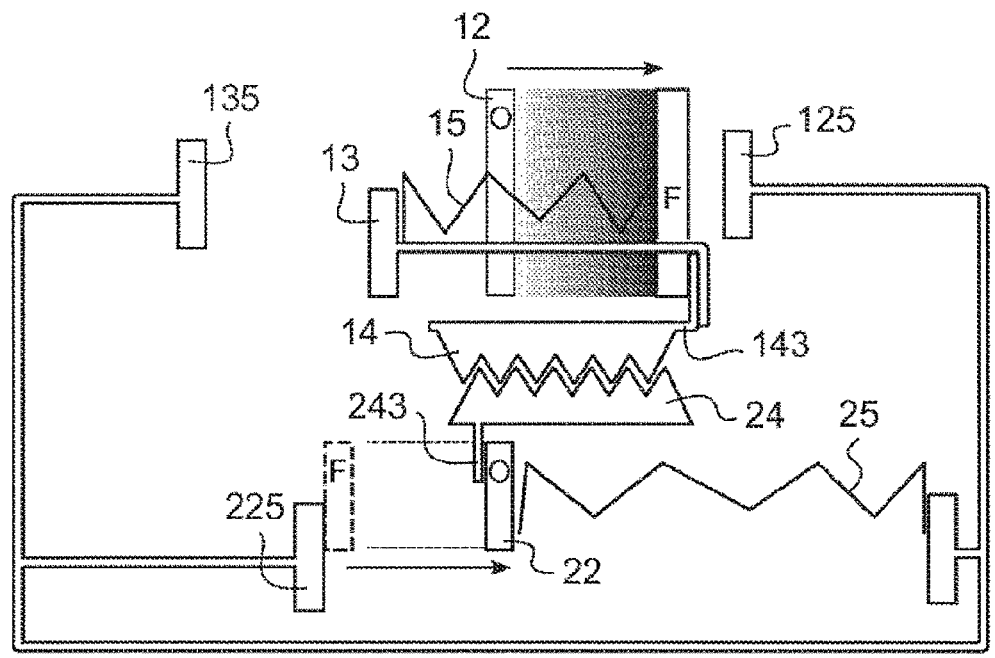
Figure 16:
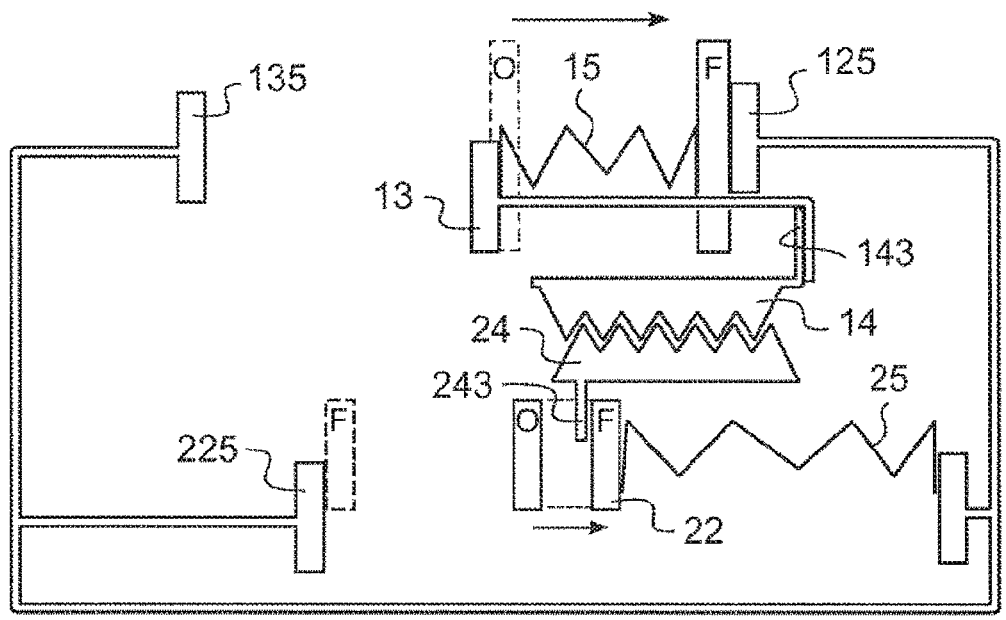
Figure 17:
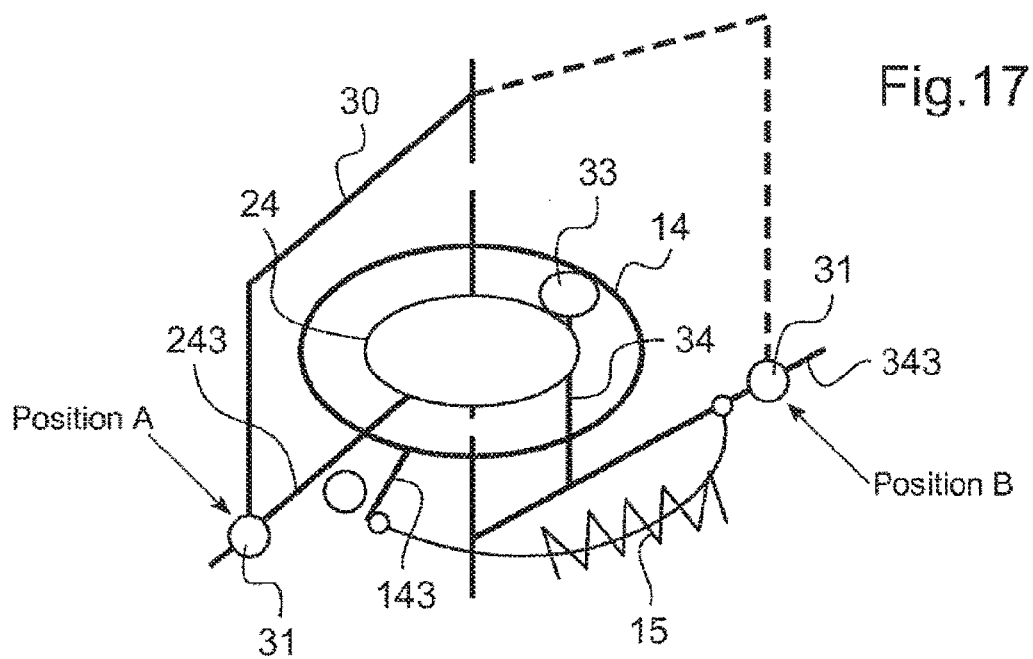

The invention will be understood more clearly and further objects, details, features and advantages thereof will appear more clearly during the following detailed explanatory description of different embodiments of the invention provided by way of a purely illustrative and non-limiting example, with reference to the accompanying schematic drawings, in which:

FIG. 1 is a schematic view of a high pressure structure for supplying a turbo-compressed engine, FIG. 2 is a schematic view of a low pressure structure for supplying a turbo-compressed engine, FIG. 3 is a front view of a first double throttle according to the invention for the supply circuit of a turbo-compressed engine, FIG. 4 is a perspective view of a shutter of the double throttle of FIG. 3 and of its control device, FIGS. 5, 6 and 7 are perspective views of three elements of the control device of FIG. 4, respectively an upper plate, a lower plate and a toothed drive wheel, FIG. 8 is a view of the degree of opening of the shutters of the two channels as a function of the angular position of the toothed drive wheel, during its actuation by the single motor of the double throttle, FIG. 9 is a view of the evolution of the effective section of the double throttle for the passage of fluid which passes through said throttle and the temperature of this fluid, according to the position given to the shutters by the motor of the double throttle, FIGS. 10 to 13 are schematic views of the relative position of the elements of FIGS. 5 to 7, respectively in the case of closure of the two shutters, closure of the shutter of the second channel associated with full opening of the first channel, full opening of the second channel associated with closure of the first channel and closure of the two shutters in opposing directions by 180°, FIGS. 14 to 16 are schematic views according to a linear view of the positioning of the elements of FIGS. 5 to 7, respectively during the closure of the first channel, the second channel being closed, the closure of the first channel simultaneously to an opening of the second channel and the closure of the second channel, the first channel being closed, FIG. 17 is a perspective schematic view of the constituent elements of the double throttle implemented according to a second embodiment, and FIGS. 18 to 21 are schematic views of the positioning of the elements of FIG. 17, respectively at the end of the closure of the first channel, the second channel being closed, in the resting position, at the end of the closure of the first channel simultaneously with the end of the opening of the second channel and finally at the end of the closure of the second channel, the first channel being closed FIG. 22 is a schematic view in diametrical section of a second double throttle with two stages according to the invention, FIG. 23 is a side view illustrating a stage of the double throttle of FIG. 22, FIG. 24 is a perspective view illustrating the body of the stage of the double throttle illustrated in FIG. 2, FIG. 25 is a perspective view illustrating the shutter of the stage of the double throttle illustrated in FIG. 2, FIG. 26 is a view from above illustrating schematically the different positions of the shutters of the double throttle of FIG. 22, FIGS. 27a to 30a are graphs respectively showing the contact zone of the first shutter of the double throttle of FIG. 22, in four successive angular positions, on the housing of the body of said throttle, illustrated flat, FIGS. 27b to 30b are graphs showing respectively the contact zone of the second shutter of the double throttle of FIG. 22, in the four successive angular positions of FIGS. 27a to 30a, on the housing of the body of said throttle, illustrated flat.

The air supply circuit to the cylinders 100 of a turbo-compressed internal combustion engine for an automotive vehicle is seen with reference to FIG. 1. The air removed from outside passes into an air filter 101 and is then compressed by the compressor 102 of the turbo-compressor which conveys the air into a double throttle, the subject of the invention. The body 1 of the double throttle has an inlet channel 2, via which the air originating from the compressor passes, and two outlet channels 3 and 4. It receives commands for controlling air between said two channels from a computer 103 known as the ECU, for Electronic Control Unit. These commands are executed in the form of a displacement of the shutters which more or less close the channels 3 and 4 under the action of an electric actuating motor (not shown) and a suitable kinematic system, which are integrated in the body of the double throttle. A heat exchanger or cooler 5 is mounted on one of the channels, called the cooled channel 3, whilst the other channel, called the bypass channel or non-cooled channel 4, is connected directly to the intake pipes of the engine. By varying the control of air between the two channels, which are combined upstream of the intake pipes, it is thus possible to adjust the intake temperature of the engine.

At the outlet of the cylinders of the engine, the combusted gases are directed toward the exhaust circuit and pass into the turbine 104 of the turbo-compressor which removes part of their residual energy to actuate the corresponding compressor 102. These exhaust gases then generally pass through a particulate filter and/or catalytic converter 105 before being discharged from the vehicle.

In the case of a high pressure structure, as shown in FIG. 1, part of the exhaust gas is recycled via a high pressure valve 106 located upstream of the turbine 104 in the intake circuit downstream of the junction between the two outlet channels 3 and 4.

In the case of a low pressure structure, as shown in FIG. 2, the same elements are found as in a high pressure structure except that the recycled part of the exhaust gases is removed downstream of the turbine 104 and reinjected via a low pressure valve 107, upstream of the compressor 102 of the turbo-compressor. The fluid which circulates in the intake circuit is thus not only air but a mixture of air and exhaust gas. The operation of the double throttle 1, however, remains the same in the two structures.

With reference now to FIG. 3, the body 1 of a double throttle is visible, together with the inlet channel 2 and the two outlet channels 3 and 4. The first channel 3 is able to be connected to a cooler 5 whilst the second channel 4 is able to short-circuit this cooler to join the intake pipes directly. Control takes place to each of the two channels 3 and 4 by a mobile shutter about a shaft which is mounted on a shaft support 7 for the first channel and 8 for the second channel. The control on each channel is carried out by the rotation of the shutter which obstructs to a greater or lesser extent the flow of air or gas which passes through the corresponding channel. The body 1 also comprises a support 6 for the electric actuating motor of the two shutters, to which they are connected by an appropriate kinematic system.

FIG. 4 shows a shutter 10 and its control device in a version designed for a cooled channel 3. The shutter 10 is mounted on its shaft 11, the lower end thereof being able to rotate in the shaft support 7 of the throttle. The shutter is thus mobile in rotation relative to the body 1. The upper end of the shaft 11 in turn bears a first upper plate 12 to which it is fixed rigidly such that a rotation of said upper plate triggers a rotation of the same amplitude of the shutter 10. On the shaft 11 is also mounted a lower plate 13 which is free in rotation about the shaft and which as a result is not driven in the case of rotation of the upper plate 12. Finally, the shaft 11 carries a toothed wheel 14 which is free in rotation about said shaft, said shaft permitting the driving of one or other or both of the two plates according to a principle which will be explained below. The toothed wheel 14 is driven in one direction or the other by a pinion mounted on the output shaft of the electric motor controlled by the ECU 103. This toothed wheel is the actuating member of the two plates and, ultimately, the positioning of the shutter 10.

Between the two plates 12 and 13 is positioned a restoring spring in rotation 15 which tends to rotate the two plates in opposing directions. To achieve this each plate comprises a notch, respectively referenced 121 and 131, which forms a housing in which the corresponding end of the restoring spring 15 is housed, and which absorbs the force exerted by the spring.

The upper plate 12 and lower plate 13 are now described in relation to FIGS. 4 to 6. Whilst the upper plate 12 has a slot 122 of the mortice type, in which a tenon carried by the shaft 11 is inserted to fix it to this shaft, the lower plate 13 comprises a tubular bearing 132 in which the shaft 11 may freely rotate. Thus both the fixing of the upper plate 12 to the shaft and the free rotation of the lower plate 13 relative to this shaft is ensured. Each of said two plates further comprises two projections extending radially, so as to form both an upper short abutment 123, respectively a lower short abutment 133, and an upper long abutment 124, respectively a lower long abutment 134, which have the purpose of constituting the limits of rotation of said plates relative to surrounding parts. The long abutments 124 and 134 have the purpose of limiting the rotation relative to the body 1 of the double throttle cooperating with the fixed abutments positioned on said body, whilst the short abutments serve as a support for the driving of the plates and/or the compression of the spring 15 under the action of the toothed wheel 14. The angular position of said abutments, both short and long, is defined so as to adapt the position of the shutter to the relevant operation of the motor.

With reference to FIG. 7, the toothed wheel 14 has the shape of a disk having teeth over the majority of the circumference of its outer face 141, so as to be able to be driven in rotation by the pinion of the actuating motor of the double throttle. At its center, it comprises a cylindrical tube 142, extending axially, which forms a bearing for the shaft 11 of the shutter for controlling the flow passing through the relevant channel. Finally, on the periphery, the toothed wheel comprises a drive finger 143 which extends axially and which has the function of cooperating with upper 123 and lower 133 short abutments of the two plates 12 and 13 of the first channel. Its radial distance from the shaft 11 is thus substantially equal to that of the short abutments of the two plates to ensure the driving thereof. Conversely, it is less than that of the long abutments to be able to pass in front of them in the region of the corresponding angular section and thus permit the rotation of the toothed wheel to continue without interfering with the fixed abutments which are intended for the long abutments of the plates.

The second channel, corresponding here to the non-cooled channel 4, comprises a control device similar to that described, apart from the fact that it only comprises one upper plate, called the second upper plate 22, and no lower plate. The finger 243 of the second toothed wheel 24 only cooperates therefore with an upper short abutment 223. In this configuration, the restoring spring 25 of, the second channel is carried at its ends, on the one hand, by a notch positioned on the upper plate and, on the other hand, by a fixed abutment which in turn is positioned on the body of the double throttle. Said elements are shown schematically in FIGS. 10 to 16. All other elements are similar to those of the first channel. It is also very clear that the first channel may be selected as being the non-cooled channel which might then comprise two plates, the second channel thus being the cooled channel which then would only comprise a single plate.

With reference now to FIGS. 8 and 9, the relative evolution of the positioning of the two shutters under the action of control by the actuating motor of the double throttle is seen, together with the drive kinematic system of the two toothed wheels 14 and 24. In this first embodiment, the pinion of the actuating motor meshes directly with one of the two toothed wheels, the second meshing with the first and thus rotating in an opposing direction. This first embodiment could also be implemented with a pinion which meshes with the two toothed wheels, which would then rotate in the same direction, the drive kinematic system of the second shutter being adapted as a result.

In these figures, the resting position i.e. that which the first plates 12 and 13 of the first channel 3 and the second upper plate 22 of the second channel 4 adopt, in the case of absence or loss of entrainment by the actuating motor, corresponds to the axis of the ordinate. This is the position referenced "0" occupied by the shutters under the action of the springs 15 and 25 of each of the channels. In this resting position, the shutter 10 of the first channel 3 is open, whilst the shutter of the second channel 4 is closed. Relative to the resting position, the actuating motor is capable of driving the toothed wheels in a rotation having the amplitude $-\alpha$ in one direction and a rotation having the amplitude $2\alpha$ in the other direction.

A rotation of the toothed wheels by the angle $-\alpha$ represented by the branch A on the figures, causes a closure of the shutter of the first channel whilst that of the second channel remains closed. In contrast, a positive rotation of the toothed wheels by an angle $\alpha$ represented by the branch B causes both a closure of the shutter of the first channel and an opening of the shutter of the second channel. Finally, the continuation of the rotation by a second angle represented by the branch C causes a closure of the shutter of the second channel, that of the first channel remaining closed. FIG. 9 describes, on the one hand, the impact of these movements on the effective surface of the throttle for the passage of intake fluid in the two channels and thus on the controlled flow and, on the other hand, the influence which they have on the temperature of the fluid entering the cylinders downstream of the confluence of the two channels.

The branch A corresponds to a control of the fluid which passes through the single first channel 3. By selecting the cooled channel for this channel, the temperature obtained remains constant and equal to that obtained at the outlet of the cooler since all the fluid passes via said cooled channel. The branch B corresponds to an adjustment of the temperature of the fluid, without control of its volume. The kinematic systems of opening and closing the two shutters are shown here, without being imperative, as they mutually compensate one another, which makes it possible to obtain a constant outlet flow for all the positions of the branch B. Finally, the branch C corresponds to a control of the flow on the single second channel and thus a control of the flow of fluid at the non-cooled temperature.

Figure 10:
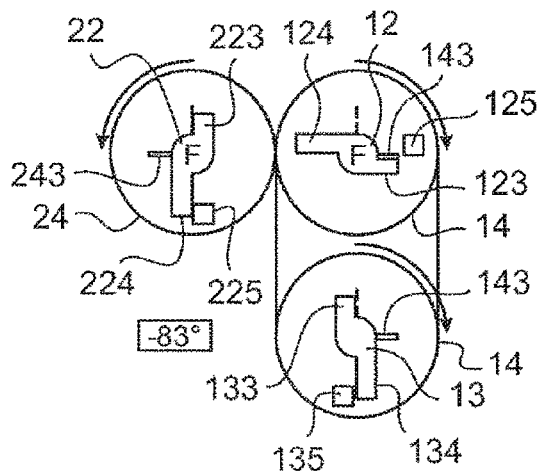
Figure 11:
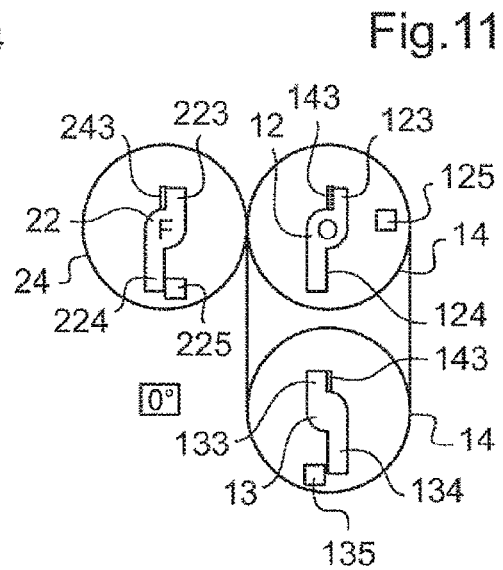

With reference now to FIGS. 10 to 13, a first embodiment which permits such an operation will be disclosed. These figures show the relative position of the toothed wheels and the upper and lower plates in the extreme positions of the branches A, B and C of FIG. 8. FIG. 11 corresponds to the resting position and FIGS. 10, 12 and 13 correspond to the respective rotations of $-\alpha$, $+\alpha$ and $+2\alpha$. In these FIGS. 10, 12 and 13, the position of the fingers 143 and 243 of the two toothed wheels in the resting position is identified by a dashed line. Finally the toothed wheel 14 of the first channel is shown twice, with the indication of the position of its finger 143 both in the region of the upper plate 12 and in the region of the lower plate 13.

FIG. 10 shows the position of the various elements of the double throttle in the extreme configuration of the branch A after a rotation of the actuating motor which has brought the shutter 10 of the first channel 3 into the closed position (rotation of the actuating motor by an angle $-\alpha$, equal here to $-83°$). The toothed wheels 14 and 24 of the two channels have turned in the opposing directions, by their selected construction, due to their teeth meshing with one another and only one of them meshing with the pinion of the actuating motor. The fingers 143 and 243 of said toothed wheels have rotated, as a result, by 83° for the first and $-83°$ for the second, with reference to the clockwise direction of rotation. On the second channel 4, the upper plate 22 has not rotated, being blocked by the cooperation of its second long abutment 224 with a second upper fixed abutment 225 positioned on the body 1 of the double throttle. The shutter of the second channel 4 remains closed in all the positions of the actuating motor which correspond to the points of the branch A.

As regards the first channel 3, a rotation of the actuating motor causes an equivalent rotation of the upper plate 12 which is driven by the rotation of the first finger 143 associated with a closure of said first channel. At the same time, the rotation of the first toothed wheel 14 has not modified the orientation of the lower plate 13, being blocked in rotation by the cooperation of its long abutment 134 with a lower fixed abutment 135 which is positioned on the body 1 of the double throttle. The rotation of the upper plate 12 and the non-rotation of the lower plate 13 permits the compression of the spring 15 of the first channel creating an offset of 83° relative to its offset in the resting position, between the circumferential orientation of the two ends of the spring 15. This compression permits the automatic return of the first upper plate to the resting position when the actuating motor returns by its angle $-\alpha$ to 0°.

In FIG. 11, the two upper and lower plates of the first channel and the upper plate of the second channel are in their resting position which corresponds to the point where the branches A and B meet. The upper plate 22 of the second channel and the lower plate 13 of the first channel are in contact with their fixed abutments respectively 225 and 135, under the action of the only pretensioning provided to the springs 15 and 25 of these two channels, in order to guarantee the automatic positioning of the shutters in their resting position, in particular in the case of malfunction of the actuating motor. In this position, the first channel 3 is fully open, allowing the inlet flow to pass to the cooled channel and the second channel 4 is closed which for reasons of safety permits the cylinders to be supplied with a fluid which is at the coolest possible temperature.

FIG. 12 shows the position of the various elements in the extreme configuration of the branch B at the point where it meets the branch C, namely after rotation of the actuating motor which has progressively brought the shutter 10 of the first channel 3 into the closed position (rotation of the actuating motor by an angle $+\alpha$, equal here to 83°) and the shutter of the second channel progressively into the open position. It is noteworthy that the closed position of the first shutter 10 is 166° of that obtained at the end of the branch A, namely substantially after a complete return of the shutter about its shaft 11. The fingers 143 and 243 of the toothed wheels have rotated as a result by $-83°$ for one and $+83°$ for the other. All along the branch B, which runs from the position 0° to the position 83° for the shutter 10 of the first channel 3, the first upper plate 12 has rotated by $-83°$ under the action of the restoring spring 15 of the corresponding channel until its upper long abutment 124 comes into abutment with corresponding first upper fixed abutment 125. More specifically, at the same time, the first finger 143 has driven the lower plate 13 into a rotation of $-83°$, which has the effect of not altering the level of compression of the restoring spring 15, leaving it at its level of pretensioning to drive the upper plate 12. At the same time, the finger 243 of the second toothed wheel 24 has driven the second upper plate 22 into a rotation of $+83°$, compressing the second spring 25 to permit the device to return to its resting position in the case of malfunction of the actuating motor. The closure of the first shutter 10 simultaneously with the closure of the second shutter makes it possible to preserve a substantially constant effective section for the throttle in its entirety and to adjust the temperature of the intake fluid, when the engine is at full power as appears in FIG. 9.

Finally, FIG. 13 shows the position of the various elements in the extreme configuration of the branch C, namely after a second rotation of the actuating motor by an angle $+\alpha$ which has progressively brought the shutter of the second channel 4 into the closed position, the shutter 10 of the first channel 3 remaining in the closed position. Here again, the closed position of the second shutter is substantially 180° from the closed position obtained at the end of the branch A. The fingers 143 and 243 of said toothed wheels have continued their rotation by a second value $\alpha$. All along the branch C, the first upper plate 12 remains blocked by the cooperation of its upper long abutment 124 against the first upper fixed abutment 125 whilst the lower plate 13 has been rotated by an angle $\alpha$ to tension the first spring 15. At the same time, the upper plate 22 of the second channel has continued its rotation, driving the corresponding shutter and ensuring a control of the flow of fluid via the second channel 4, at a constant temperature, since the first channel remains constantly closed. The rotation of the upper plate 22 also has the effect of compressing the second spring 25 in a complementary manner. The compression of the two springs 15 and 25 is thus combined to allow the devices to return to their resting position.

With reference now to FIGS. 14 to 16, the kinematic system put in place to implement the diagrams of FIGS. 8 and 9 may be seen in a further view. These figures describe the displacements of the elements during the branches A, B and C with an indication in dashed lines of the position adopted by a plate when it corresponds to the resting position of the corresponding shutter. The plates 12, 13 and 22 are illustrated by rectangles which change position. The state of the shutters corresponding to the positioning of the plates is indicated by "O" for open and "F" for closed in said rectangles. The displacement of the plates along the branches A, B and C is also shown by two positions connected together by an arrow.

FIG. 14 shows the sequence on the branch A where the actuating motor passes from 0° to −α, i.e. that of a progressive closure of the shutter 10 of the first channel 3 from its resting position which corresponds to a fully open position. It also corresponds to that of a control of intake fluid on the single first channel 3, the second channel 4 remaining sealed by the second shutter 20. On this branch A, the finger 143 of the first toothed wheel 14 drives the upper plate 12 of the first channel compressing the first spring 15. The first upper plate 12 is shown as unshaded in its initial fully-open position referenced O, and in a closed position, shaded and referenced F. The lower plate 13 is held in place by the lower fixed abutment 135 of the body of the throttle which blocks it in rotation and permits the compression of the first spring 15. The second channel is not affected during this branch A, the second spring 25 being in its pretensioned position and the second upper plate 22 being in its resting position, bearing against the second upper fixed abutment 225 under the action of said second spring 25.

FIG. 15 shows the position of the various elements on the branch B which correspond to a so-called proportional control of the intake fluid. All the points of the branch B specifically correspond to a control in variable proportions of the fluid passing in the two channels. The finger 143 of the first toothed wheel 14 after it has substantially carried out a half-turn pushes the lower plate 13 and progressively closes the first shutter 10. The first spring 15 remains in this branch B in a pretensioned position as long as the first upper plate 12 does not come into contact with the first upper fixed abutment 125 and drives the first upper plate 12. At the same time, the second finger 243 progressively opens the second channel 4, pushing the second upper plate 22 and subsequently the second shutter 20. The second spring 25 is progressively compressed, in contrast to the first spring which remains pretensioned all along the branch B. At the end of the branch B, the first shutter 10 is completely closed and the second shutter 20 completely open. As indicated above, the kinematic system of the two shutters is designed, a priori, so as to maintain a constant flow for both the channels 3 and 4 for all points of the branch B.

FIG. 16 finally shows the control on the second channel 4 by the displacement of the second upper plate under the action of the second toothed wheel 24. More specifically, the finger 243 of the second toothed wheel 24 drives the short abutment 223 of the second upper plate and subsequently the shutter of the second channel which progressively closes. At the same time, the first upper plate 12 remains in abutment against the first upper fixed abutment 125 and the compression of the first spring 15 increases as the first lower plate 13 is driven in rotation by the first finger 143 whilst the first upper plate 12 is in abutment. The compression of the two springs 15, 25 is combined.

With reference now to FIGS. 17 to 21, a second embodiment will be described which is characterized by the presence of a single spring and that of an epicyclic gear train consisting of two toothed wheels. In this embodiment, the actuating motor does not directly drive the toothed wheels but it acts via an actuator which either rotates the planet wheel carrier which meshes with the toothed wheels or rotates the toothed wheel of one of the two channels, in this case the second channel, in the opposite direction to before. The shutters are also driven, for the first channel by the shaft of the planet wheel carrier, and for the second channel by the toothed wheel on which the actuator acts directly. The elements of the second embodiment which have the same function as in the first embodiment bear the same reference numeral and are not described again.

Figure 18:
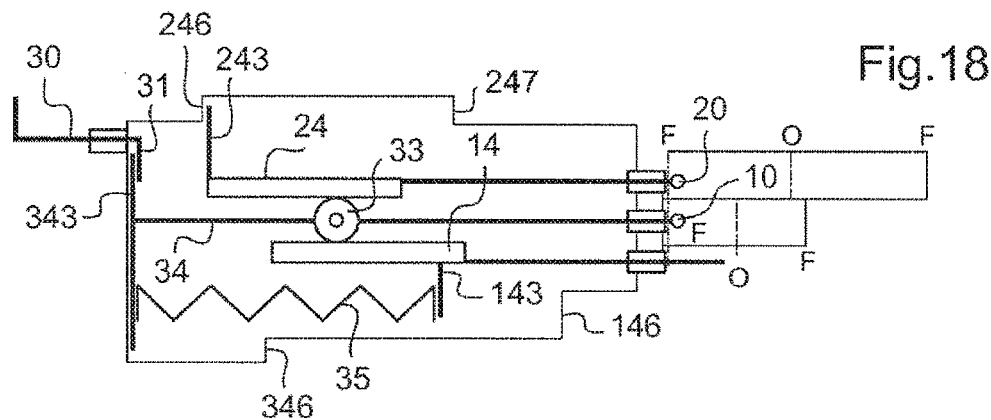
Figure 19:
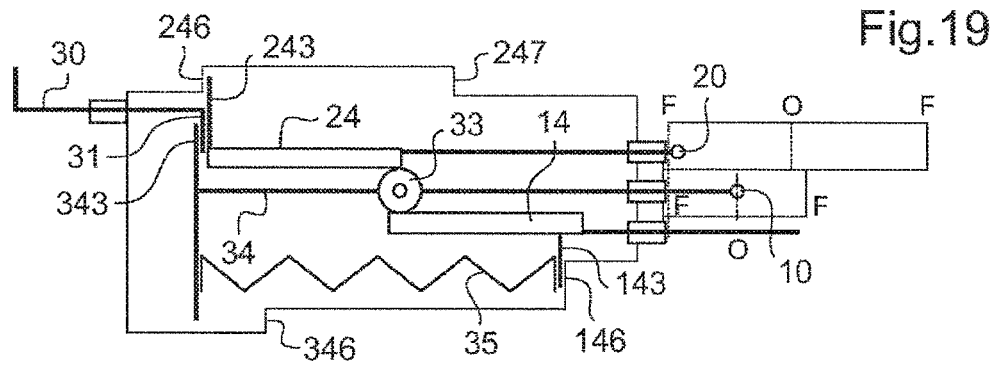
Figure 20:
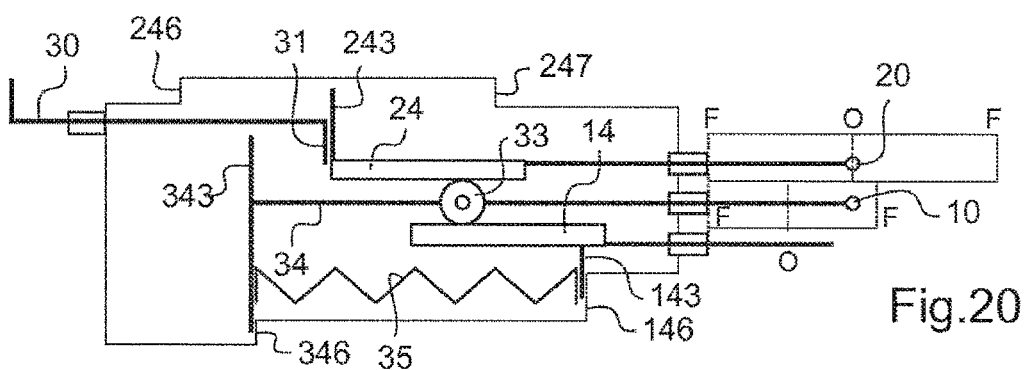

FIG. 17 is a schematic perspective view of the device, whilst FIGS. 18 to 21 are views of the same device unfolded on a plane. In FIG. 19, the device is described in the resting position, i.e. that where the shutter 10 of the first channel is open and that of the second channel is closed. The positioning is thus similar to that of FIG. 11 in the first embodiment, i.e. at the transition between the branches A and B. FIG. 18 corresponds to a rotation of the drive motor by an angle −α whilst FIGS. 20 and 21 correspond to rotations of said drive motor by angles respectively +α and +2α.

The first toothed wheel 14 operates as the external ring of an epicyclic gear train whilst the second toothed wheel 24 operates as the planet wheel of this gear train. A planet wheel 33 connected in rotation to a planet wheel carrier 34 is housed between said two toothed wheels and provides the combined driving thereof. A drive element 30 actuated by the actuating motor (not shown) is mobile in rotation about the axis of the epicyclic gear train and has a drive pin 31, in the first instance of the finger 243 of the second toothed wheel and in the second instance of a third finger 343 carried by the planet wheel carrier 34. The drive element is shown in FIG. 17 in solid lines and dashed lines in the two positions where it engages respectively with the finger 243 of the second toothed wheel and the finger 343 of the planet wheel carrier. A restoring spring 35 tends to push back the finger 343 of the planet wheel carrier 34 from the finger 143 of the first toothed wheel and bring back the planet wheel carrier to its resting position corresponding to the pretensioned state of the spring.

Finally, the body 1 of the double throttle comprises a certain number of fixed abutments which are detailed below, against which the fingers of the toothed wheels and that of the planet wheel carrier bear, in order to operate the epicyclic gear train and permit the rotation of two of its elements whilst the third is halted.

In the position −α of the actuating motor, which is illustrated in FIG. 18 and which corresponds to the end of the branch A, the actuator 30 is in a fully retracted position which is associated with a fully closed position of the shutter 10 of the first channel 3. At the same time, the second toothed wheel 24 remains in a position where the shutter of the second channel 4 is also closed; this position is defined by positioning on a first fixed abutment 246 of the second channel which is formed on the body 1 of the double throttle. More specifically, all along the branch A, the finger 243 of the second toothed wheel 24 remains in contact with said first fixed abutment of the second channel 246 and the second shutter 20 remains closed as a result. In contrast, the shutter 10 of the first channel follows the movement of the planet wheel carrier 34 and progressively closes along this branch A passing from the position 0° to −α, thus ensuring the control on the single first channel 3. As for the first toothed wheel 14, positioned as the ring of the epicyclic gear train, it is driven in rotation by the toothed wheel 33 of the planet wheel carrier 34 since the planet wheel 24 is blocked by the first fixed abutment 246 of the second channel. It does not encounter the abutment along the branch A. By contrast, the spring 35 is subjected to a first compression, due to the planet wheel carrier 34 rotating less quickly than the ring 14 of the epicyclic gear train; this compression ensures the possibility of the return of the planet wheel carrier 34 to the resting position when the drive element 30 is released or pushed back to the position 0°.

In the resting position, illustrated by FIG. 19 and corresponding to a rotation to 0° of the actuating motor, the second finger 243 as already mentioned, is in abutment against its first fixed abutment 246 whilst the pin 31 of the actuator 30 is in contact with this second finger 243. The third finger 343 is also in contact with the pin 31, being returned to this position under the action of the restoring spring 35. The position of the actuator 30 corresponds to a position of the planet wheel carrier 34 in which the shutter 10 of the first channel 3 is open. The second channel 4 is still in the closed position and the finger 143 of the first toothed wheel is in abutment against its fixed abutment 146.

All along the branch B, the finger 143 of the first toothed wheel remains in abutment against its fixed abutment 146. The extension of the actuator 30 pushes the second toothed wheel 24, thus opening the second channel; at the same time under the action of the second toothed wheel which acts as a planet wheel, the planet wheel carrier 34 is driven in rotation which ensures the closure of the shutter 10 of the first channel. Thus the desired proportional control is obtained and the constancy of the flow of intake fluid on both channels. At the end of the branch B, illustrated by FIG. 20, the actuator 30 is displaced sufficiently for the planet wheel carrier 34, under the action of the restoring spring 35, to be brought against a fixed abutment of the planet wheel carrier 346 which corresponds to a fully closed position of the first channel 3. The second toothed wheel 24 is in an intermediate position between its first abutment of the second channel 246 and a second abutment of the second channel 247, explained below, which corresponds to the fully open position of the second shutter 20.

Figure 21:
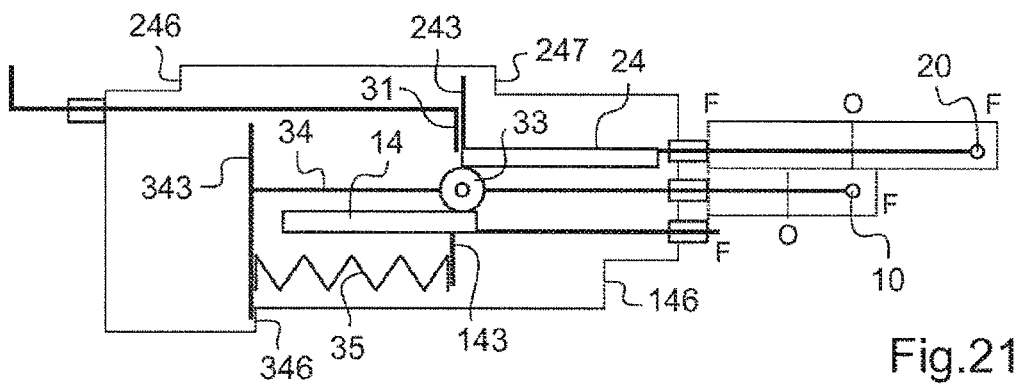

The branch C corresponds to a greater extension of the actuator 30, the final position thereof being illustrated in FIG. 21. The planet wheel carrier 34 remains blocked by its fixed abutment 346 and the epicyclic gear train generates a simultaneous rotation of the two toothed wheels. The actuator 30 completely pushes back the second toothed wheel 24 by its pin 31 and progressively closes the shutter of the second channel 4, whilst the first channel 3 remains closed, thus ensuring the control of the intake fluid via the single second channel. This progression continues until the second finger 243 strikes the second abutment of the second channel 247, which is formed in the body 1 of the double throttle. The position of this second abutment corresponds to the fully closed position of the second shutter 20, thus preventing said shutter from exceeding this fully closed position. As for the first toothed wheel, its rotation by the epicyclic gear train compresses the restoring spring 35 to permit the return of the second toothed wheel 24 on the branch C and then on the branch B, when the actuator 30 is retracted again.

Finally, this second embodiment reproduces the same format for opening and closing the shutters of the two channels 3 and 4 as the first embodiment, as illustrated in FIGS. 8 and 9.

In the preceding embodiments, the kinematic system enables one of the shutters 10, 20 to be disengaged relative to the other shutter to ensure the control function via one of the channels, the shutter of the other channel remaining fixed. This being the case, according to a further feature of the invention the double throttle according to the invention could also function without a disengagement kinematic system.

As illustrated in FIG. 22, according to a further feature, the body 1 of the throttle comprises an internal housing 404 separated into a first stage 500 for the first flow channel 3 comprising said first shutter 10 and a second stage 502 for said second flow channel 4 comprising said second shutter 20.

As appears more clearly in FIGS. 23 to 25, although the figures only shown a single stage 500 of said internal housing 404, said housing is cylindrical, of circular cross section. Moreover, said first and second shutters 10, 20 comprise at least one sealing part 414 arranged in a plane which is inclined relative to said cylindrical housing 404 and cooperating with the lateral wall 405 of said housing by a peripheral generatrix so as to ensure a sealed contact between the shutters 10, 20 and the body 1 in at least one angular position. Said throttle further comprises a control rod 415 driven by said kinematic system and connected to the first and second shutters 10, 20.

In other words, the body 1 of the throttle is provided with an internal housing 404 which is cylindrical, with an axis A, and of circular section and which is delimited by a lateral wall 405.

In this case, the internal housing 404 may be incorporated into a bore. On each stage, an inlet 406 and an outlet 407 forming a channel for the fluid designed to circulate through the housing of the valve discharge into the wall thereof, radially to the axis A. This inlet 406 and outlet 407 are aligned relative to one another. They have in this case a longitudinal axis X intersecting perpendicular to the axis A of the housing 404 and have identical diameters. They extend beyond the lateral wall 405 of the housing via conduits, not illustrated, integrated in the body 1 and designed for connection with the circuit provided with said throttle.

The stages 500, 502 are separated by a partition 409, provided with an orifice 413. At one end and/or at the other end thereof is located a transverse cover 410 extended by an end-piece 411 with an axial hole 412. The orifice 413 of the partition 409 and/or the axial hole of the transverse cover(s) 410 are penetrated by said control rod 415.

The inclined part 414 is shaped as an elliptical shutter 416 arranged in a plane which is inclined relative to the axis A of the circular cylindrical housing 404 and centered on said axis A so that its peripheral edge 417 is in constant contact with the lateral wall 405 of the housing 4 so as to isolate the inlet 406 and the outlet 407 of each stage, in at least one given angular position of the sealing means, to interrupt the flow of fluid or to place the inlet 406 and the outlet 407 in fluidic communication, with a flow which is able to be controlled according to the given angular opening of the shutters 10, 20. This peripheral edge 417 thus constitutes a generatrix G which is always in sealed contact with the lateral wall 405 of the housing.

By "inclined" is understood strictly between 0° and 90°. By "shutter" is understood here as a part having two surfaces which are inclined relative to the axis A and connected via the peripheral edge 417. Said inclined surfaces may be parallel to one another. The part has a small thickness, namely a distance between said inclined surfaces which is much less than the diameter of the body, in particular ten times less. It refers, for example, to a disk.

Geometric considerations are taken into account to ensure correct operation of the throttle. The shutter 416 has an elliptical shape with a large axis greater than the diameter of the circular housing 404 and with a small axis substantially less than the diameter of the circular housing 404. In this case, the diameter of the circular housing 404 is also greater than identical diameters of the fluid inlets 406 and outlets 407. The connecting rod 415 is arranged along the axis A of the housing so as to be centered on the inclined disk, with the angle B between the inclined plane of the disk and the axis A equal to 45° here. To achieve constant contact with the lateral wall 405 of the housing, the large axis of the disk 416 is thus substantially equal to the diameter of the housing multiplied by $\sqrt{2}$. This contact may be defined as being a cylinder/cylinder contact between the wall 405 of circular section of the housing 404 and the generatrix G corresponding to the peripheral edge 417 of the inclined disk 416 and which is circular in projection on a plane perpendicular to the axis of rotation of the shutter. The small axis of the shutter 416 could be substantially greater than the diameter of the fluid inlets 406 and outlets 407.

The mounting of the shutters 10, 20 in the housing 404 of the body of the valve does not require an awkward adjustment operation, it simply being required to place the control rod 415 in axial abutment in the housing to center the disks 416 relative to the fluid inlets and outlets.

The rod 415 is attached to the disk 416 by assembly or overmolding, or shaped with the disk so as to create a one-piece sealing means. By way of example, the disk 416 may be made of plastics and the rod 415 of metal or vice versa or the two may be made of plastics material or metal according to the one-piece embodiment or a selected composite. The axial hole 412 of the end piece 411 could be provided with a guide bearing 418. Said control rod 416 could be continuous and pass through said housing.

In the position illustrated in FIG. 23, the inclined disk 416 isolates the inlet 406 from the outlet 407, preventing the flow of fluid through the valve 1. To achieve this, the peripheral edge 417 of the inclined disk 416 cooperates sealingly and completely with the lateral wall 405 of the cylindrical housing 404 in the manner of a partition separating the housing into two separate and sealed chambers, each rotated toward one of the inlet and outlet channels 406, 407 for the passage of fluid. This angular position of the inclined disk 416 corresponds to a closure of the illustrated flow channel.

When the drive device is activated, it causes the rotation of the control rod 415 and the shutters 10, 20 according to the desired angle, corresponding to a determined flow of the fluid through the relevant channel. As a result of the rotation, the peripheral edge 417 is no longer in full contact with the lateral wall 405 of the housing but only partially since the opposing parts of the edge 417 are located opposite circular inlets and outlets 406 and 407. This angular retracted position of the disk permits the passage of fluid between the inlet 406 and the outlet 407 in the region of one and/or the other of the stages, via the sealed internal housing of the body 404.

It is noteworthy that it is possible for the throttle to operate in both directions from an original position as the throttle is able to operate over more than 360°. Such a valve ensures, as a result, sealing in both directions of closure by adapting the inclined disk in the circular housing (cylinder-cylinder contact), which disk by its symmetry may be mounted in any manner in both directions without polarization in the body of the valve. Moreover, as the edge of the disk is displaced in a linear manner on the cylindrical wall, this makes it possible to avoid contamination between the disk and the wall and to ensure self-cleaning of the valve.

To ensure the control law according to the invention, said first and second shutters 10, 20 are offset at an angle to one another relative to said control rod 415 and/or said flow channels 3, 4 are offset at an angle to one another relative to said control rod 415, the angular offset of the shutters 10, 20 being associated with the angular offset of said flow channels 3, 4.

According to the illustrated example, the flow channels 3, 4 are oriented in the same direction and the first and second shutters 10, 20 are offset by 60°. In other words, the inlet and outlet orifices 406, 407 are aligned in the same direction from one stage to another.

FIGS. 26 and 27 to 30 help to understand more clearly how the successive positions occupied by the shutters 10, 20 permit the desired control law to be implemented.

FIG. 26 illustrates different points of passage of the shutters, relative to the inlet and outlet orifices 406, 407 of the corresponding channels, during their rotation about the axis A. When the shutters are within the axis of said orifices, this is a fully open position. As soon as they are rotated by more than 60° in one direction or the other, the corresponding flow channels are then closed.

FIGS. 27a to 30a, respectively 27b to 30b, show the position of the inclined disk 416 of the first shutter 10, respectively of the second shutter 20, along the height (mm) of the lateral wall 405 of the housing, which wall is developed by −180° to +180° to be shown in plan view. The outline 504, 506 of the shutters 10, 20 on the lateral wall 405 is illustrated by a double undulating line which thus has a sinusoidal shape. The inlet orifices 406 correspond to a circle, centered on the graphs. The outlet orifices 407 each correspond to two semi-circles, located on both sides of the graphs. Firstly, it is noticed that whatever their angular position, said outlines 504, 506 are clearly offset by 60° relative to one another between each of FIGS. 27a and 27b, 28a and 28b, 29a and 29b and 30a and 30b.

In FIGS. 27a and 27b, the shutters 10, 20 are both closed, their outline 504, 506 not intersecting the circles of the orifices 406, 407.

In FIGS. 28a and 28b, the first shutter 10 is open, the outline 504 intersecting the circles of the orifices 406, 407 of the first channel, whilst the second shutter is still closed, its outline 506 not intersecting the circles of the orifices 406, 407 of the second channel. Thus a control has been achieved via the first channel alone, the second shutter 10 passing from a closed position illustrated in FIG. 27a to a fully open position illustrated in FIG. 28a whilst the second shutter 20, although mobile, continues to seal the second channel.

In FIGS. 29a and 29b, the first shutter 10 is closed again, the outline 504 no longer intersecting the circles of the orifices 406, 407 of the first channel whilst the second shutter 20 is open, its outline 506 intersecting the circles of the orifices 406, 407 of the second channel. Thus a simultaneous control is carried out via the first and second channel, the first channel passing from a fully open position corresponding to FIG. 28a to a new closed position corresponding to FIG. 29a, whilst the second channel passes from a closed position corresponding to FIG. 28b to a fully open position corresponding to FIG. 29b.

In FIGS. 30a and 30b the two shutters 10, 20 are both closed again, their outline 504, 506 not intersecting the circles of the orifices 406, 407. Thus a control has been carried out via the second channel alone, the second shutter 20 passing from a fully open position illustrated in FIG. 29b to a closed position illustrated in FIG. 30b, whilst the first shutter 10, although mobile, continues to seal the second channel.

From the positions illustrated in FIGS. 27a, 27b to the positions illustrated in FIGS. 30a, 30b, the shutters 10, 20 have carried out a rotation of 180°. They could carry out the same cycle in the reverse direction or continue their rotation until reaching the initial position of FIGS. 27a, 27b.

Said control rod 415 could be directly connected to the actuating motor. Said kinematic system thus consists of the shaft of said actuating motor.

Overall, whatever the embodiment, the double throttle according to the invention permits, by progressive rotation of a single actuating motor, intake fluid to be controlled via the single first channel (branch A according to the engaged embodiments), the second channel being closed, via the single second channel (branch C in the engaged embodiments), the first channel being closed, or simultaneously via the two channels (branch B according to the engaged embodiments) by control between the two channels. When one of the channels opens downstream of the throttle toward a cooler 5, whilst the other bypasses the cooler before joining the first channel, the double throttle permits the temperature of the intake fluid to be adjusted. Also, by calibrating the opening and closing curve of the shutters as a function of the angle of rotation of the actuating motor, it is possible to preserve a constant overall flow during this proportional control and only to act on the final temperature of the fluid in this branch.

The invention claimed is:

1. A double throttle for controlling the intake fluid of an internal combustion engine and adjusting the temperature thereof, comprising:
    a body in which a first and a second flow channel of said intake fluid are arranged and first and second mobile sealing shutters are positioned in said channels to dose the flow passing through said channels; and
    an actuating motor for said shutters and a kinematic system capable of actuating the first shutter and/or the second shutter in response to a rotation of said motor,
    wherein the kinematic system is designed to ensure selectively:
        the control of the flow passing through the first flow channel by actuating the first shutter,
        a proportional control via the two flow channels by simultaneous actuation of the two shutters, an increase in the flow via one of the flow channels being associated with a reduction in the flow via the other channel,
        the control of the flow passing through the second flow channel by actuating the second shutter,
        the control of the flow passing through the first flow channel, the position of the second shutter being fixed, and
        the control of the flow passing through the second flow channel, the position of the first shutter being fixed, and
    wherein the kinematic system comprises:
        a first drive member driving the first shutter, said first drive member being mobile in rotation between two extreme positions located on either side of a resting position corresponding to an absence of entrainment by the actuating motor,
        a second drive member driving the second shutter,
        an intermediate mobile member,
        a spring positioned between the first drive member and the intermediate mobile member, and
        an actuating means ca able of displacing the first drive member from the resting position to a first of its extreme positions, counter to a compression of said spring against said intermediate mobile member of an extension of said spring relative to said intermediate mobile member.

2. The double throttle as claimed in claim 1, wherein a continuous rotation of the actuating motor successively causes said throttle via the first channel, said proportional control via the two channels and said control via the second channel.

3. The double throttle as claimed in claim 1, wherein the kinematic system is designed to ensure a full constant flow during said proportional control.

4. The double throttle as claimed in claim 1, wherein said intermediate mobile member bears against an abutment connected to the body of the double throttle during said compression.

5. The double throttle as claimed in claim 4, wherein said actuating means is a finger carried by a toothed wheel driven in rotation about a drive shaft of the first shutter, called the common shaft, by said actuating motor, the first drive member being a first plate rigidly connected to the common shaft and comprising at least one extension extending radially to form an abutment for said drive finger and the intermediate mobile member being a second plate which is mobile in rotation about the common shaft, the ends of said spring each being fixed to one of the two plates.

6. The double throttle as claimed in claim 1, wherein said intermediate mobile member is displaced during the displacement of said first drive member, said compression being carried out by a displacement of said first drive member which is slower than that of said intermediate mobile member.

7. The double throttle as claimed in claim 6, wherein said intermediate mobile member is a ring of an epicyclic gear train, the first drive member being attached to its planet wheel carrier.

8. The double throttle as claimed in claim 7, wherein the second drive member is attached to the planet wheel of said epicyclic gear train.

9. The double throttle as claimed in claim 6, wherein the rotation of the components of said epicyclic gear train is provided by an element actuated by the actuating motor, said element acting counter to a single restoring spring of said double throttle.

10. A double throttle for controlling the intake fluid of an internal combustion engine and adjusting the temperature thereof, comprising:
    a body in which a first and a second flow channel of said intake fluid are arranged and first and second mobile sealing shutters are positioned in said channels to dose the flow passing through said channels; and
    an actuating motor for said shutters and a kinematic system capable of actuating the first shutter and/or the second shutter in response to a rotation of said motor,
    wherein the kinematic system is designed to ensure selectively:
        the control of the flow passing through the first flow channel by actuating the first shutter,
        a proportional control via the two flow channels by simultaneous actuation of the two shutters, an increase in the flow via one of the flow channels being associated with a reduction in the flow via the other channel, and
        the control of the flow passing through the second flow channel by actuating the second shutter, and
    wherein the body comprises a cylindrical internal housing of circular cross section, separated into a first stage for the first flow channel comprising said first shutter, and a second stage for said second flow channel comprising said second shutter, said first and second shutters comprising at least one sealing portion arranged in a plane which is inclined relative to said cylindrical housing and cooperating with the lateral wall of said housing by a peripheral generatrix so as to ensure sealed contact between said shutters and the body in at least one angular position, said throttle further comprising:

a control rod, driven by said kinematic system and connected to the first and second shutters, said first and second shutters being offset at an angle to one another relative to said control rod and/or said flow channels being offset at an angle to one another relative to said control rod.

11. The double throttle as claimed in claim 10, wherein the flow channels are oriented in the same direction and the first and second shutters are offset by 60°.

12. The double throttle as claimed in claim 10, wherein said control rod is continuous and passes through said housing.

13. An air intake module for an internal combustion engine comprising a double throttle as claimed in claim 1.

14. The module as claimed in claim 13, the first flow channel of the throttle being connected to a cooler of the intake module whilst the second flow channel short-circuits said cooler, the first shutter being open and the second shutter being closed in the case of absence or loss of entrainment by the actuating motor.

\* \* \* \* \*